United States Patent [19]

Shute

[11] 3,737,651

[45] June 5, 1973

[54] NAVIGATION LIGHT

[76] Inventor: Harry Norman Shute, 2047 Reeveston, Richmond, Ind. 47374

[22] Filed: June 7, 1971

[21] Appl. No.: 150,691

[52] U.S. Cl. .................................240/7.5, 240/51.11

[51] Int. Cl. ............................................B63b 45/04

[58] Field of Search..................240/7.5, 51.11, 51.12

[56] References Cited

UNITED STATES PATENTS

| | | | |
|---|---|---|---|
| 2,501,437 | 3/1950 | Cline et al. | 240/51.12 |
| 3,564,234 | 2/1971 | Phlieger, Jr. | 240/51.11 R |
| 3,596,237 | 7/1971 | Barber, Jr. | 240/51.12 |

*Primary Examiner*—Donald O. Woodiel
*Attorney*—Watts, Hoffman, Fisher & Heinke

[57] ABSTRACT

Waterproof navigation light comprising a fluorescent lighting unit embedded in a clear or colored transparent or translucent plastic.

2 Claims, 8 Drawing Figures

PATENTED JUN 5 1973 3,737,651

INVENTOR.
HARRY NORMAN SHUTE
BY Watts, Hoffmann,
Fisher, & Heinke
ATTORNEYS

PATENTED JUN 5 1973 3,737,651

INVENTOR.
HARRY NORMAN SHUTE

BY *Watts, Hoffmann,
Fisher & Heinke*
ATTORNEYS

NAVIGATION LIGHT

BACKGROUND OF THE INVENTION

1. Field of the Invention

The invention relates to ships' running lights.

2. Description of the Prior Art

Ship running lights are now available but those that meet present or proposed standards are disproportionally expensive for owners of small and medium size powerboats.

SUMMARY OF THE INVENTION

The present invention provides a novel and improved navigation light especially adapted for medium size and small powerboats including outboard motor boats, and the like, operating under Inland Rules and/or International Rules, that will be inexpensive to manufacture, sturdy in construction, trouble-free in use, watertight, non-corrosive, easily installed, readily cleaned, efficient and have sufficient range to meet all light intensity standards, and which comprises a fluorescent lighting unit embedded in a watertight transparent or translucent plastic.

The invention will be better understood and further advantages, as well as objects thereof, will become apparent from the accompanying drawings and the ensuing description of two embodiments of the invention.

DESCRIPTION OF THE PREFERRED EMBODIMENTS

Figure 1:
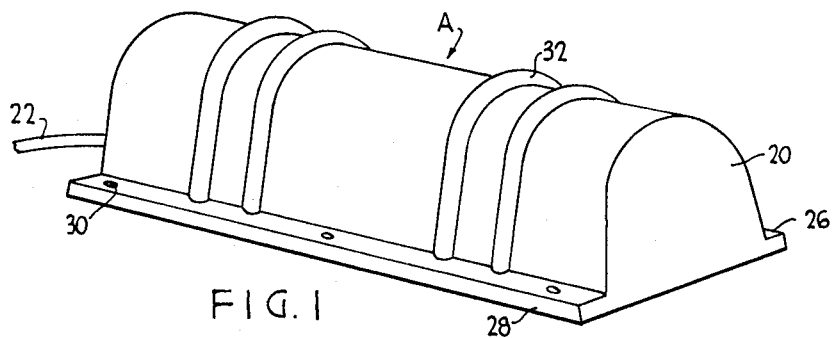
FIG. 1 is a perspective view of a navigation light embodying the present invention.

Both embodiments of the invention shown in the drawings, where they are designated generally by the reference characters A and B, respectively, comprise conventional fluorescent light units each including a tubular fluorescent lamp 10, which typically may be 6 inches to 12 inches or more in length, connected in a conventional circuit by the necessary wiring 12, with a starter 14 and transfer or balance 16 all embedded in a waterproof transparent plastic housing or case 20 and connected to a power line 22 extending through the case. The light A also includes an opaque reflector 24 located behind or below the lamp 10.

In the light A the flurescent lamp 10 is elongated, as previously mentioned, and is positioned on top of the balance transformer 16. The reflector 24 is channel-shaped and is positioned on the transformer 16 underneath the lamp 10 with the flanges extending upwardly along the lamp about ¼ to ⅛ of the height of the lamp. The starter 14 is located at the near or right-hand end of the lamp, as viewed in the drawings, and is connected in the electric circuit with the lamp unit 10 and balancing transformer 16 with the electric conductor wires 12. With the parts assembled, as mentioned above, and the power line 24 suitably connected to the lamp circuit, the plastic housing 20 is cast about the assembly forming an integral waterproof light unit thus embedding the parts in the plastic housing 20. Flanges 26, 28 formed along opposite lower side edges of the base of the housing 20 are provided with mounting holes 30 for the reception of screws, bolts, or the like. Alternatively the light may be mounted in some convenient manner other than by the use of screws or bolts.

At least the part of the housing 20 above the flanges of the reflector 24 is preferably semi-circular in shape and transparent. That part of the housing below or behind the reflector 24 is not necessarily transparent or translucent. A light of any desired "point," for example, 12, 20, 32, etc. (each point equals 11½°) may be made by increasing or decreasing the extent that the reflector 24 extends about the lamp 10. The plastic case or housing may be any suitable material, for example, one of the Acrylics such as Acrylite, Lucite or Plexiglass, a Polyester or an Epoxy, etc. It will also be understood that a red or green pigment may be added to the plastic to produce red and green navigation running lights.

In the preferred embodiments shown the lamp enclosing housings are provided with longitudinally spaced ridges semi-circular in cross section which act as lens to intensify the light. In light A the ridges 32 are arcuate in shape and in light B they are rings 34.

Figure 2:
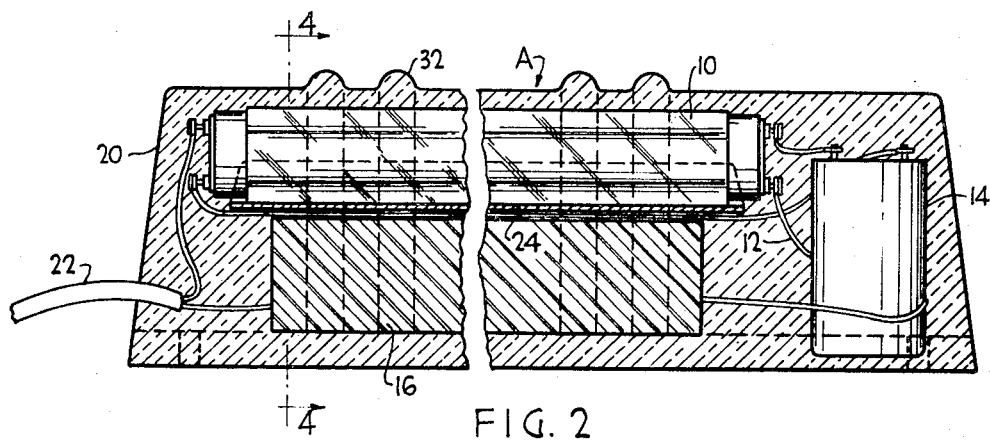
FIG. 2 is a longitudinal sectional view, with portions shown in elevation, approximately on the line 2—2 of FIG. 3.
Figures 3, 4:
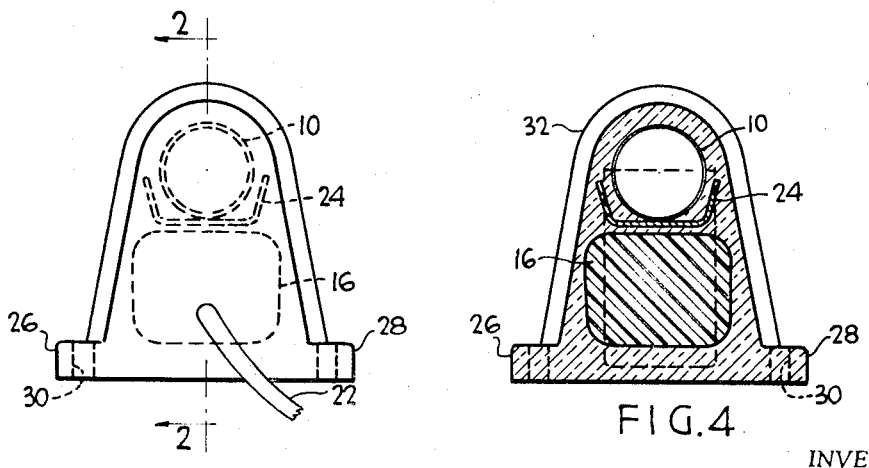
FIG. 3 is an end view of the light shown in FIGS. 1 and 2 looking from the rear or left-hand end.
FIG. 4 is a sectional view on the line 4—4 of FIG. 2.
Figure 5:
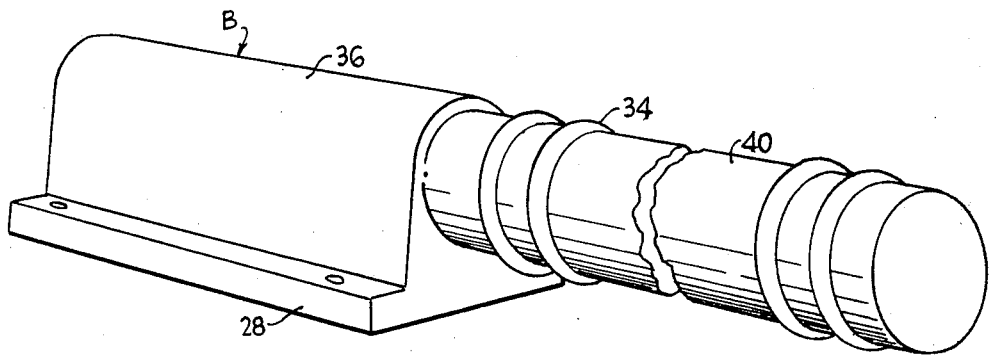
FIG. 5 is a perspective view of a navigation light of different construction than shown in the preceding figures, but embodying the present invention.
Figure 6:
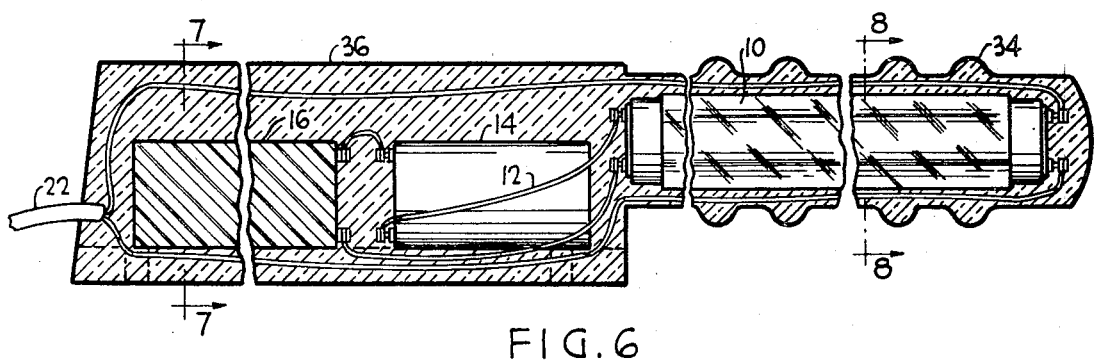
FIG. 6 is a longitudinal sectional view, with portions shown in elevation, of the light shown in FIG. 5.
Figure 7:
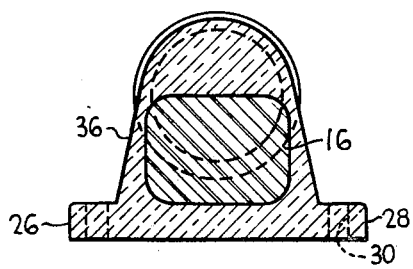
FIG. 7 is a sectional view on the line 7—7 of FIG. 6.
Figure 8:
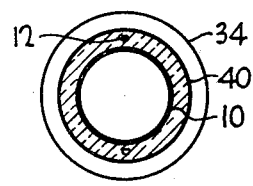
FIG. 8 is a sectional view on the line 8—8 of FIG. 6.

The navigation light B, shown in FIGS. 5 to 8, is essentially the same as that shown in FIGS. 1 to 4 and the corresponding parts are designated by the same reference characters. The essential difference between the two lights A and B is the fact that in light B the fluorescent lamp projects from one end of the case part 36, which is essentially a mounting part or member, and the fluorescent lamp or a projecting end part thereof is encased in a plastic part 40 which encircles the lamp tube. This, together with the fact that there is no reflector, the light is a 32 point or a 360° light as required of some navigation running lights.

While preferred embodiments of the invention have been described in considerable detail, it will be apparent that the invention is not limited to the specific construction shown and described but that it may be otherwise embodied, and it is the intention to hereby cover all embodiments thereof which come within the scope of the appended claims.

Having thus described my invention, what I claim is:

1. In a waterproof navigation light, a fluorescent lighting unit comprising a fluorescent lamp, balance transformer and starter connected by electric conductor wires all embedded in a plastic housing cast about the lamp, transformer, starter and wires at least a portion of which is translucent.

2. In a waterproof navigation light, a fluorescent lighting unit comprising an elongated fluorescent lamp, balance transformer and starter connected by electric conductor wires, and a reflector at one side of said lamp, all embedded in a plastic housing cast about the lamp, transformer, starter and wires at least the portion of which opposite to said reflector is translucent.

* * * * *